US009409998B2

(12) United States Patent
Laukkanen et al.

(10) Patent No.: US 9,409,998 B2
(45) Date of Patent: Aug. 9, 2016

(54) METHOD AND APPARATUS FOR PROCESSING FIBRIL CELLULOSE AND FIBRIL CELLULOSE PRODUCT (71) Applicant: UPM-KYMMENE CORPORATION, Helsinki (FI)

(72) Inventors: Antti Laukkanen, Helsinki (FI); Markus Nuopponen, Helsinki (FI)

(73) Assignee: UPM-KYMMENE CORPORATION, Helsinki (FI)

(*) Notice: Subject to any disclaimer, the term of this patent is extended or adjusted under 35 U.S.C. 154(b) by 2 days.

(21) Appl. No.: 14/378,474

(22) PCT Filed: Jan. 29, 2013

(86) PCT No.: PCT/FI2013/050095
§ 371 (c)(1),
(2) Date: Aug. 13, 2014

(87) PCT Pub. No.: WO2013/121086
PCT Pub. Date: Aug. 22, 2013

(65) Prior Publication Data
US 2015/0045549 A1 Feb. 12, 2015

(30) Foreign Application Priority Data
Feb. 13, 2012 (FI) .................................. 20125158

(51) Int. Cl.
C08L 1/02 (2006.01)
C08B 15/04 (2006.01)
D21H 11/20 (2006.01)
D21C 9/00 (2006.01)
D21H 11/18 (2006.01)

(52) U.S. Cl.
CPC . *C08B 15/04* (2013.01); *C08L 1/02* (2013.01); *D21H 11/18* (2013.01); *D21H 11/20* (2013.01)

(58) Field of Classification Search
CPC .......... C08L 1/02; C08B 15/04; D21H 11/20; D21C 9/002
USPC ............................. 536/63, 85, 124, 7; 162/163
See application file for complete search history.

(56) References Cited

U.S. PATENT DOCUMENTS 3,882,029 A 5/1975 Fischer et al.
5,487,419 A * 1/1996 Weibel .................... C08B 15/02
162/100
5,964,983 A 10/1999 Dinand et al.

FOREIGN PATENT DOCUMENTS

| EP | 0 859 011 B1 | 5/2001 |
| EP | 2 386 682 A1 | 11/2011 |
| JP | A-2004-161 | 1/2004 |
| JP | A-2010-209510 | 9/2010 |
| JP | A-2012-1626 | 1/2012 |
| WO | WO 00/47628 A2 | 8/2000 |
| WO | WO 01/66600 A1 | 9/2001 |
| WO | WO 2009/084566 A1 | 7/2009 |

OTHER PUBLICATIONS

"Pressure Filters", *Custom Equipment Solutions Co. (CESCO)*, date accessed Nov. 20, 2012, Internet Address: http://www.gocesco.com/pressurefilters.html.
Search Report issued in Finnish Patent Application No. 20125158 dated Nov. 22, 2012.
Office Action issued in Finnish Patent Application No. 20125158 dated Nov. 22, 2012.
International Search Report issued in International Patent Application No. PCT/FI2013/050095 mailed on Jun. 4, 2013.
Written Opinion of the International Searching Authority issued in International Patent Application No. PCT/FI2013/050095 mailed on Jun. 4, 2013.
Written Opinion of the International Preliminary Examining Authority issued in International Patent Application No. PCT/FI2013/050095 mailed on Apr. 2, 2014.
International Preliminary Report on Patentability issued in International Patent Application No. PCT/FI2013/050095 dated Jun. 27, 2014.
Sep. 8, 2015 Extended Search Report issued in European Patent Application No. 13749276.5.

* cited by examiner

*Primary Examiner* — Patrick Lewis
*Assistant Examiner* — Everett White
(74) *Attorney, Agent, or Firm* — Oliff PLC (57) ABSTRACT A method for processing fibril cellulose which is in the form of aqueous fibril cellulose gel includes lowering the pH of the aqueous fibril cellulose gel to provide aqueous fibril cellulose gel of reduced water retention capacity, and dewatering the aqueous fibril cellulose gel of reduced water retention capacity to provide dewatered fibril cellulose. The dewatering is performed by pressure filtration.

34 Claims, 4 Drawing Sheets

METHOD AND APPARATUS FOR PROCESSING FIBRIL CELLULOSE AND FIBRIL CELLULOSE PRODUCT

FIELD OF THE INVENTION

The present invention relates to a method for processing fibril cellulose. The invention also relates to an apparatus for processing fibril cellulose and to a fibril cellulose product.

BACKGROUND OF THE INVENTION

Fibril cellulose refers to isolated cellulose microfibrils or microfibril bundles derived from cellulose raw material. Fibril cellulose, which is also known as nanofibrillar cellulose (NFC) and by other related names, is based on a natural polymer that is abundant in nature. Fibril cellulose has many potential uses for example based on its capability of forming viscous gel in water (hydrogel).

Fibril cellulose production techniques are based on grinding (or homogenization) of aqueous dispersion of pulp fibers. The concentration of fibril cellulose in dispersions is typically very low, usually around 1-5%. After the grinding process, the obtained fibril cellulose material is a dilute viscoelastic hydrogel. The material itself is usable as such in many applications, but logistic costs are too high to transport the material from the production site. In some applications, the high water content is not acceptable, i.e. the formulations do not tolerate large amounts of water.

Thus, there is an evident need for increasing the concentration of the final product so that the transport costs would be decreased and the NFC could be used in the final destination at a suitable concentration desired by the end user by simply redispersing the fibril cellulose in water.

Strong water retention is typical for fibril cellulose since water is bound to the fibrils through numerous hydrogen bonds. Conventional separation techniques for lowering the water content, such as filtration or evaporation are not feasible with fibril cellulose hydrogels.

The fundamental problem in mechanical water removal is the ability of fibril cellulose hydrogel to form a very dense and impermeable nanoscale membrane around itself, for example during filtration. The formed shell prevents diffusion of water from the gel structure, which leads to very slow concentration rates. The same applies to vacuum evaporation where the skin formation blocks the evaporation of water.

Another problem in drying of fibril cellulose is the non-redispersibility of the dried material. During the water removal, the fibril-water bonds are replaced with fibril-fibril interactions and the fibrils are permanently aggregated. This can be prevented with the use of certain additives during the drying stage, such as CMC, or by chemical modification of the microfibril surface, e.g. oxidation or carboxymethylation. With those methods fibril cellulose can be re-activated after complete drying.

In the literature, the use of organic solvents in separation of fibril cellulose from water has been described. The proposed processes have been based on precipitation of dilute fibril cellulose dispersion into a non-solvent, such as isopropanol. Precipitation is typically carried out from dilute solutions with high speed mixing.

Methods for dewatering fibril cellulose are known for example from international publication WO-0166600 and European patent EP-0859011.

SUMMARY OF THE INVENTION

It is a purpose of the invention to provide a novel method for processing fibril cellulose.

The method comprises
lowering the pH of the aqueous fibril cellulose gel to provide aqueous fibril cellulose gel of reduced water retention capacity, and
dewatering the aqueous fibril cellulose gel of reduced water retention capacity to provide dewatered or concentrated fibril cellulose.

Lowering the pH of an aqueous medium containing fibril cellulose changes water-fibril interactions so that the water retention capacity of the aqueous fibril cellulose gel is reduced, thus enabling water to be removed therefrom mechanically and/or by evaporation. If the fibril cellulose contains anionically charged groups that act as bases (acid moieties in dissociated from), lowering the pH will convert these groups to undissociated form and the electrostatic repulsion between the fibrils is no more effective and the water-fibril-interaction is changed. This will make the gel also stronger.

When the fibril cellulose that has been acidified in the above manner is concentrated mechanically to the dry substance of no more that 40%, preferably no more than 30%, for example 10-30 wt % and more specifically 10-25%, it is still unexpectedly well redispersable in water, despite the fact that the acid treatment where the pH is lowered makes the gel stronger. Mechanical concentration means pressing water out of the fibril cellulose, and this can performed in practice by pressure filtration. No additional drying methods are needed remove water further if the aim is to obtain this kind of partly dried redispersable product.

The fibril cellulose product consisting of acidified cellulose can thus be left in a dry substance content where it still contains residual water by drying it by mechanical means, to afford a good redispersability to the product. The drying can be continued to 100% or nearly 100% (for example at least 90% or 95%% DS (dry substance) by means of other drying methods where the residual water is removed by evaporation.

Fibril cellulose containing anionically charged groups can be for example chemically modified cellulose that contains carboxyl groups as a result of the modification. Cellulose obtained through N-oxyl mediated catalytic oxidation (e.g. through 2,2,6,6-tetramethyl-1-piperidine N-oxide) or carboxymethylated cellulose are examples of anionically charged fibril cellulose where the anionic charge is due to a dissociated carboxylic acid moiety. Other fibril cellulose grades having dissociable functional groups which can be converted to acid form to strengthen the fibril cellulose gel can also be used. The pH of the gel is brought below the pKa value of the anionically charged fibrils. In case of fibrils containing carboxyl groups, typically at pH under 3-4, the carboxylic acid is not dissociated and the electrostatic repulsion between the fibrils is not effective.

The method comprises bringing the aqueous fibril cellulose gel and acidic medium, preferably an aqueous acidic medium, to contact with each other, and retaining the contact for a time sufficient to effect the changes in the gel structure required for the lowered water retention capacity. According to one embodiment, the fibril cellulose gel and acid are simply mixed to a homogeneous gel which has lowered water retention capacity. This step could be integrated already in the manufacture of the fibril cellulose by performing the mixing step with the same device that is used in the last fibrillation stage. According to another embodiment, the fibril cellulose gel is carefully introduced into the acidic medium so that it remains as physical entities. This can be done by extruding or spraying the gel to the acidic medium to make e.g. "worm" or "sphere"-like objects out of the gel, or by supplying the gel in larger "blocks" to the medium and breaking them to smaller particles in the medium. These blocks can be crumbled into smaller entities in the volume of acidic medium mechanically for example by agitating. The form of the entities depends on the way of supplying the fibril cellulose into the acidic medium.

In the second stage of the process, according to the firstly mentioned embodiment, the water is removed from the acidic homogeneous volume of gel by mechanical means, such as pressure filtration. According to the second embodiment the entities are separated physically from the acidic medium, and the remaining residual water is removed from them by dewatering. The dewatering of the entities can take place mechanically by pressure, for example using pressure filtration.

According to both embodiments, the dewatering can be continued by evaporation, depending on the desired degree of dewatering (final dry matter content) of the product. The evaporation can be conducted in vacuum and/or at elevated temperature.

In the second embodiment, the hydrogel of fibril cellulose is introduced in the acidic medium carefully so that it remains coherent and does not become dispersed, that is, a phase boundary of the gel against the volume of acidic medium exists the whole time after the contact of the hydrogel with the medium, although the phase boundary may change due to disintegration of larger gel entities, such as or blocks, into smaller ones in the acidic medium.

When the hydrogel of fibril cellulose is in contact with the acidic medium in the form of physical entities, they keep their original dimensions and the shapes where the gel was initially supplied to the acidic medium, or the dimensions and shapes change to the final dimensions and shapes of the entities due to the disintegration of the original gel entities.

The acidic medium that is used for dewatering of the hydrogel is any aqueous medium that has sufficiently low pH. In principle any organic or inorganic acid capable of lowering the pH of water can be used. The acidic medium can be in form of acid bath in a tank or vessel into which the aqueous fibril cellulose gel is introduced in any of the above ways, either to make a homogeneous mixture or keeping the original fibril cellulose gel as separate entities. The acidic medium can also be added to the aqueous fibril cellulose gel that is previously placed in a tank or vessel, or as a side flow to a fibril cellulose product issuing from the last fibrillation stage.

The fibril cellulose that has been in contact with the acidic medium can be neutralized with a base at a later dewatering stage, for example after removing water by pressure, like after pressure filtration step. This can be followed by washing to remove the salt. If organic acid of sufficient volatility, such as acetic acid or formic acid, are used in the acidic medium, the residual acid can be removed by evaporation.

The dewatering taking place during the process leads to an enforcement of the hydrogen bonds between the fibril cellulose fibrils and to mechanical stabilization of the physical entities formed.

When water is used for carrier liquid of the acidic medium, the process can be performed without organic solvents.

During the introduction of the fibril cellulose hydrogel into the acidic medium, the stirring or agitation can be intensive, and the result is a homogeneous gel. According to the other embodiment, where the original phase boundaries of the gel and the acidic medium are to be conserved, the stirring or agitation, if used, must be careful in order to avoid the dispersing of the fibril cellulose hydrogel into the acidic medium so that the hydrogel is maintained as discrete physical entities.

One possibility according to the second embodiment is to supply the hydrogel through a port that comprises several orifices or nozzles, and the shape of the entities in the solvent volume is thus determined by the shape of the orifices or nozzles and by the supply rate of the hydrogel into the solvent. The port is preferably immersed in the acidic medium so that the hydrogel is immediately in contact with the acidic medium after issuing from the orifices or nozzles. The supply rate can be even and continuous, in which case continuous physical entities are formed in the acidic medium, or intermittent, which creates discontinuous entities, for example beads.

According to the second embodiment, another possibility is to disintegrate the hydrogel while in the acidic medium. In this case the hydrogel is supplied in larger blocks into the solvent volume, whereafter it is disintegrated to the physical entities mechanically so that the phase boundaries remain between the acidic medium and the fibril cellulose. This can be done for example by the blades of the agitator. The NFC hydrogel can for example be disintegrated in a smaller volume of the acidic medium, whereafter this volume together with the physical entities formed is combined with a larger, final volume of the acidic medium.

According to the second embodiment, after completing the dewatering, the physical entities obtained are comminuted to a smaller size, for example particulate matter or powder which is an easily transportable form of dry fibril cellulose, which has retained its rheological properties. This comminuted form of the fibril cellulose can be used as a redispersable dry product, which the end user can make to a gel of desired concentration by simply adding water, preferably at the site of the use of the gel.

According to the first embodiment, the homogeneous acidic gel can be mechanically dewatered to DS (dry substance) content of 10-30%, whereafter it can be possibly neutralized. This product, in acidic or neutralized form, can be used as redispersable product. The cake obtained after the pressure filtration of the acidic gel can be comminuted to a suitable size to make an easily transportable and redispersable product.

According to the second embodiment, the acidic gel that is formed as separate physical entities can be mechanically dewatered to DS of 10-30% whereafter it can be possibly neutralized. This product in acidic or neutralized form, after possible comminuting, can be used as redispersable product.

BRIEF DESCRIPTION OF THE DRAWINGS

FIGS. 3-5 show results of the experiments conducted with the obtained products.

DETAILED DESCRIPTION OF THE INVENTION

In this context, the term "fibril cellulose", sometimes also called "nanofibrillated cellulose" or nanofibrillar cellulose (NFC for short), or simply "nanocellulose" is used, it being understood that also "microfibrillar cellulose" or "microfibrillated cellulose" (MFC) are commonly used terms for the substance to be described in more detail below.

The fibril cellulose consists of cellulose fibrils whose diameter is in the submicron range. It forms a self-assembled hydrogel network even at low concentrations. These gels of fibril cellulose are highly shear thinning and thixotrophic in nature.

The fibril cellulose is prepared normally from cellulose raw material of plant origin. The raw material can be based on any plant material that contains cellulose. The raw material can also be derived from certain bacterial fermentation processes. Plant material may be wood. Wood can be from softwood tree such as spruce, pine, fir, larch, douglas-fir or hemlock, or from hardwood tree such as birch, aspen, poplar, alder, *eucalyptus* or *acacia*, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed. The cellulose raw material could be also derived from cellulose-producing micro-organisms. The micro-organisms can be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

The term "fibril cellulose" refers to a collection of isolated cellulose microfibrils or microfibril bundles derived from cellulose raw material. Microfibrils have typically high aspect ratio: the length might exceed one micrometer while the number-average diameter is typically below 200 nm. The diameter of microfibril bundles can also be larger but generally less than 1 μm. The smallest microfibrils are similar to so called elementary fibrils, which are typically 2-12 nm in diameter. The dimensions of the fibrils or fibril bundles are dependent on raw material and disintegration method. The fibril cellulose may also contain some hemicelluloses; the amount is dependent on the plant source. Mechanical disintegration of fibril cellulose from cellulose raw material, cellulose pulp, or refined pulp is carried out with suitable equipment such as a refiner, grinder, homogenizer, colloider, friction grinder, ultrasound sonicator, fluidizer such as microfluidizer, macrofluidizer or fluidizer-type homogenizer. In this case the fibril cellulose is obtained through disintegration of plant cellulose material and can be called "fibrillated cellulose".

"Fibril cellulose" can also be directly isolated from certain fermentation processes. The cellulose-producing micro-organism of the present invention may be of the genus *Acetobacter, Agrobacterium, Rhizobium, Pseudomonas* or *Alcaligenes*, preferably of the genus *Acetobacter* and more preferably of the species *Acetobacter xylinum* or *Acetobacter pasteurianus*.

"Fibril cellulose" can also be any chemically or physically modified derivate of cellulose nanofibrils or nanofibril bundles. The chemical modification could be based for example on carboxymethylation, oxidation, esterification, or etherification reaction of cellulose molecules. Modification could also be realized by physical adsorption of anionic, cationic, or non-ionic substances or any combination of these on cellulose surface. The described modification can be carried out before, after, or during the production of microfibrillar cellulose, or any combination of these processes.

The fibril cellulose can be made of cellulose which is chemically premodified to make it more labile. The starting material of this kind of fibril cellulose is labile cellulose pulp or cellulose raw material, which results from certain modifications of cellulose raw material or cellulose pulp. For example N-oxyl mediated oxidation (e.g. 2,2,6,6-tetramethyl-1-piperidine N-oxide) leads to very labile cellulose material, which is easy to disintegrate to fibril cellulose. For example patent applications WO 09/084566 and JP 20070340371 disclose such modifications.

The fibril cellulose is preferably made of plant material. One alternative is to obtain the nanofibrils form non-parenchymal plant material where the fibrils are obtained from secondary cell walls. One abundant source of cellulose fibrils is wood fibres. The fibril cellulose is manufactured by homogenizing wood-derived fibrous raw material, which may be chemical pulp. When NFC where the cellulose is modified cellulose is manufactured from wood fibres, the cellulose can be labilized by oxidation before the disintegration to fibrils. The disintegration in some of the above-mentioned equipments produces fibrils which have the diameter of only some nanometers, which is 50 nm at the most and gives a clear dispersion in water. The fibrils can be reduced to size where the diameter of most of the fibrils is in the range of only 2-20 nm only. The fibrils originating in secondary cell walls are essentially crystalline with degree of crystallinity of at least 55%.

Particularly preferred cellulose material to be used in the invention is cellulose derivative, where cellulose molecules in the fibrils contain some additional functional groups compared with the chemical structure of native cellulose to make the cellulose anionically charged. Such groups can be, by way of example only, carboxymethyl, and/or carboxyl. This kind of fibril cellulose samples are obtained e.g. by fibrillation of carboxymethylated or, oxidated (N-oxyl mediated) cellulose pulp, respectively. The modification can be performed also during, or after fibrillation, or any combination of these. When a gel consisting of any of these modified fibril cellulose grades is brought in contact with an acid, the gel will remain more easily coherent than with a native cellulose based gel. All fibril cellulose grades where the cellulose contains functional groups that make the cellulose behave like a weak acid whose dissociation is pH dependent can be used.

Figure 1:
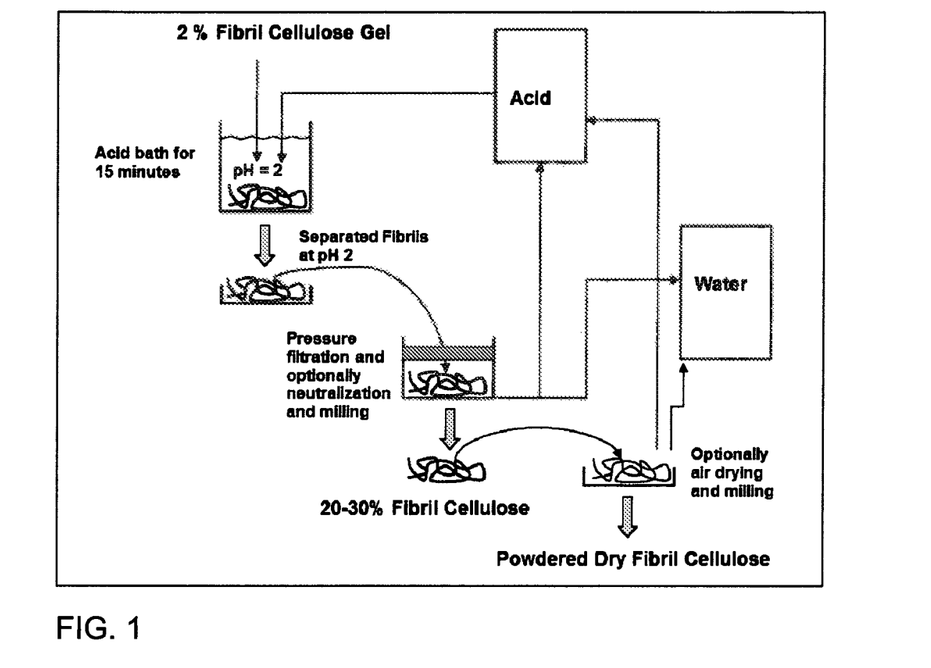
FIGS. 1 and 2. show principles of the two alternative embodiments where fibril cellulose gel is brought in contact with an acidic medium, (FIG. 1: the second embodiment and FIG. 2. the first embodiment)

FIG. 1 shows the basic principle of a process that can be applied in industrial scale. Aqueous fibril cellulose gel is introduced into a volume of aqueous acidic medium. Thus, the volume of the acidic medium can be called an "acid bath" for the fibril cellulose gel. The pH of the acidic medium is below 4, preferably below 3.

In industrial scale, the fibril cellulose gel is introduced into the acid bath through a suitable port that allows the formation of discrete physical entities whose shape is determined by the port and the rate of introduction of the gel. The port may comprise several orifices through which the hydrogel is extruded. The hydrogel can be introduced for example through an extruder with a suitable breaker plate that generates numerous elongate entities, hydrogel "worms" or ribbons, objects that can be generally called as "strings", in the acid bath. Alternatively, spray nozzles could be used if the aim is to obtain small spheres or beads, in which case the hydrogel is introduced at short intervals, "dropwise", rather than as continuous strand. A port introducing the hydrogel in this way can comprise several spray nozzles in parallel from which the hydrogel issues as drops. The orifices or nozzles are preferably immersed in the acid bath.

Another method for industrial application is to supply the aqueous fibril cellulose gel in larger blocks to the extraction bath and disintegrate it mechanically to the physical entities inside the bath. In this case the entities formed are more random in shape.

The concentration of the cellulose fibrils in the gel is preferably 0.5-5%, more preferably 1.5-3.5%, based on the total weight of the gel. The fibril cellulose exists usually at these concentrations after the manufacture. However, higher concentrations are possible if the aim is to dewater the gel more efficiently or increase its strength to avoid its dispergation during the initial phases of the extraction process in the extraction bath.

For the physical entities made of the fibril cellulose hydrogel to remain in processable form in the solvent, their dimensions should be large enough. Without limiting the scope of the invention it can be estimated that the smallest dimension of the entity (such as diameter in the case of an elongate filament-like entity) in the extraction bath should be at least 100 μm, preferably at least 0.5 mm.

After the contact with the acidic medium, the physical entities are dewatered by separating them from the acidic medium and applying pressure to them. This is feasible in a large scale by pressure filtration. The dewatering can be continued by evaporating water from the already mechanically dewatered physical entities so that a desired dry matter content can be achieved. Before the dewatering by evaporation, the physical entities can be made smaller in size by disintegrating mechanically. The dewatering by evaporating is preferably performed by forced gas drying at elevated temperature and/or vacuum (reduced pressure).

It is also possible that the shape that the physical entities have acquired in the acidic medium is retained, when for example elongate filamentary, ribbon-like or sheet-like objects are to be made which are later to be used as structural parts or as freestanding elements. In this case the aqueous fibril cellulose gel can issue in the acidic medium through a port that gives the required form to the product, and the entities are only cut to shorter lengths and/or trimmed (not redispersable product). For the use as structural parts or freestanding elements, it is possible to introduce additional substances in the fibril cellulose gel before it is introduced in the acidic medium, These substances can be fully miscible with the gel at neutral pH but coagulable by the effect of pH so that they coagulate at low pH when the fibril cellulose comes in contact with the acid. The acid bath can also contain additional substances which can enter the gel upon its contact with the acid bath.

The acid filtrate form the pressure filtration can be recirculated back and makeup acid can be added to keep the pH in the acid bath at sufficient low level.

After dewatering is complete, the physical entities can be comminuted by a suitable mechanical process to a final size. The dried fibril cellulose will be transported in this size to the end user for redispersion. However, the physical entities can be left to their original state after the dewatering and transported in this state to the end user. The entities can also be left in a "semi-dry" state as explained above, for example by omitting one or more final dewatering stages, as could be done by removing the water mechanically so that a certain dry substance content is reached, for example not more than 40% DS, preferably no more than 30%, for example in the range of 10-30%. It is also possible that the fibril cellulose remains acidic (not neutralized), if the end use of the redispersed fibril cellulose allows the presence of the acid residues within the fibril cellulose or if it may be even useful for the final use.

Figure 2:
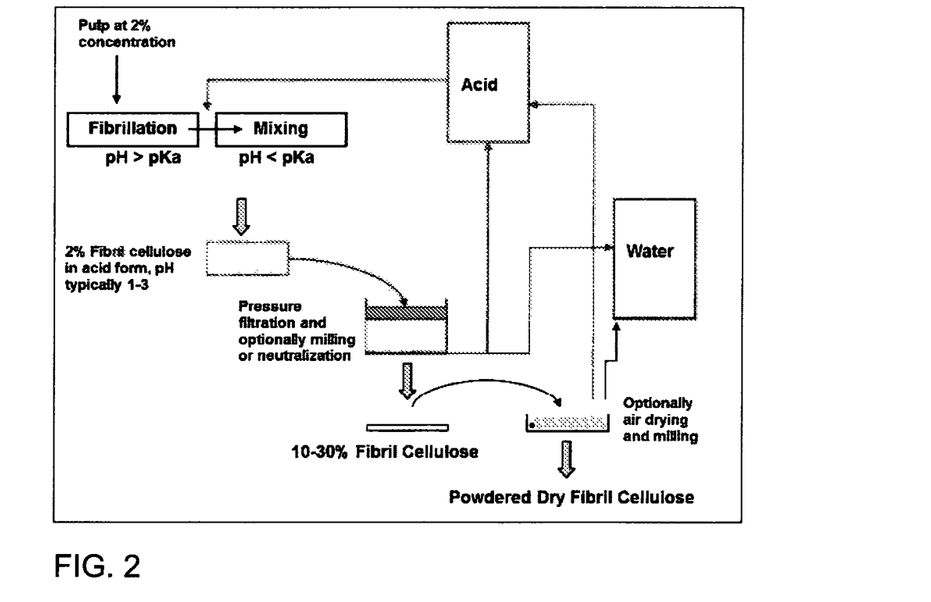

FIG. 2 shows the same process steps as FIG. 1 except that the acidified fibril cellulose is not kept as separate entities but mixed homogeneously with the acidic medium, according to the first embodiment explained above. According to this process as well, the product can be left in a semi dry state by omitting one or more final dewatering stages.

In the both embodiments, water removal from acidified fibril cellulose is done using pressure filtration. The pressure filtration proceeds till the end point where the fibril cellulose forms a cake with a final desired DS (dry substance). The final DS of the filter cake can be 10-30% (concentration of the fibril cellulose, the remainder being liquid and possible other ingredients). Filtration can be performed so that the filtrate is clear without any particles penetrated through the filter cloth. Filtration temperature is preferably higher than 30° C. Pressure during the filtration can be 5-100 bars (1 bar=100 kPa). Pressure filtration device can be a fixed volume chamber filter press or membrane filter press. In a fixed volume chamber filter press the pressure is caused by the increased pumping pressure as the solids build up in the chamber during filtering of the liquid through the filter cloth. In a membrane filter press the pressure builds up initially as above, and in the final stage of the filtration the cake formed in the chamber is compressed or squeezed by a membrane or diaphragm on one side or on both sides to remove further liquid from the cake. The filtration chamber is limited by filter cloth on one side or both sides, which determine the flat sides of the cake to be formed from the solids (cellulose fibrils). The cake is formed during the filtration either by effect of pumping pressure of the fibril cellulose or the combined effect of pumping pressure and subsequent compression/squeezing by a membrane/diaphragm or a pair of membranes/diaphragms. The cake formed is a flat piece where the flat opposite sides are formed according to the opposite sides of the chamber and where liquid removal has taken place through one or through both sides of the cake due to the filter cloth on one or both sides of the chamber, respectively. The dimension of the cake perpendicularly to the flat sides (thickness) is considerably smaller than any dimension along the flat sides which are a wide surfaces.

Two sided liquid removal is recommended for the efficiency of the pressure filtration process, because more filtering area (area of filter cloth) is available per volume of the fibril cellulose.

The fibril cellulose, whether dry or semidry, can be redispersed also to another solvent than water. It is also possible that fibril cellulose that has been left in acid from, after transportation or storage dry or semidry, is neutralized after redispersing it in water or another solvent.

Manufacturing Examples with Fibril Cellulose

Starting Materials

The fibril cellulose raw material was functionalized cellulose where the cellulose had been oxidized by N-oxyl mediated oxidation prior to disintegration of the fibers to fibril cellulose, or functionalized by carboxymethylation prior to the disintegration of the fibers.

General Example (1) 10 ml of fluidizator grade 0.9% carboxymethylated fibril cellulose is placed in a beaker (diameter 4 cm). 5 ml of acetic acid (10% concentration) is poured on top of the gel.

(2) After 12 hours, the acetic acid is poured out from the beaker. The gel is strengthened due to pH drop and it is possible to lift the gel slice out from the beaker.

(3) The solidified gel is rinsed with water and placed between two handsheets. The water is removed by pressing the gel manually through a flat surface for 30 seconds. Immediately after pressing the water is freely flowing from the gel and sucked into the handsheets. After the pressing, the gel volume is between 1/10 and 1/20 of the original volume, i.e. concentration is increased to 10-20%.

Manufacturing Examples with Fibril Cellulose
Starting Materials

The fibril cellulose raw material was functionalized cellulose where the cellulose had been oxidized by N-oxyl mediated oxidation prior to disintegration of the fibers to fibril cellulose. Two types of acid were used, either glacial acetic acid (99.9%) or hydrochloric acid (2.0 M).

Example 1

Acid Treatments—Process 1

This example describes the acid treatment part of the process 1, described in FIG. 1 (second embodiment).
Weak Acid Treatment;
  (4) 6 liters of distilled water was placed in a beaker and pH was lowered with acetic acid to pH 3.
  (5) 2.0 liters of 2.3% fibril cellulose gel at pH 7 was dropped into the acid bath in the form of 20 ml gel entities in a time period of 15 minutes.
  (6) Immediately after the gel entities were immersed into the acid bath, the gels were solidified and they preserved separated.
  (7) After 12 hours, the excess acetic acid was poured out from the beaker. The gel particles were strengthened due to pH drop and it was possible to separate the gels with a coarse wire filter. The concentration of the gel remained approximately the same, i.e. close to initial concentration.
  (8) The sample obtained by this treatment is named as Sample A1
Strong Acid Treatment:
  (1) 6 liters of distilled water was placed in a beaker and pH was lowered with hydrochloric acid to pH 2.
  (2) 2.0 liters of 2.3% fibril cellulose gel (Sample 1 type) at pH 7 was dropped into the acid bath in the form of 20 ml gel entities in a time period of 15 minutes.
  (3) Immediately after the gel entities were immersed into the acid bath, the gels were solidified and they preserved separated.
  (4) After 12 hours, the excess hydrochloric acid was poured out from the beaker. The gel particles were strengthened due to pH drop and it was possible to separate the gels with a coarse wire filter. The concentration of the gel remained approximately the same, i.e. close to initial concentration.
  (5) The sample obtained by this treatment is named as Sample B1

Example 2

Acid Treatments—Process 2

This example describes the acid treatment part of the process 2, described in FIG. 2 (first embodiment).
Weak Acid Treatment:
  (1) 2.0 liters of 2.3% fibril cellulose gel (Sample 1 type) at pH 7 was placed in a beaker. The pH was lowered with acetic acid to pH 3.
  (2) After the initial mixing, the mixture was effectively homogenized with a high speed blender (Büch homogenizer). After the homogenization, the concentration remained approximately the same, i.e. close to initial concentration.
  (3) The sample obtained by this treatment is named as Sample A2
Strong Acid Treatment:
  (1) 2.0 liters of 2.3% fibril cellulose gel (Sample 1 type) at pH 7 was placed in a beaker. The pH was lowered with hydrochloric acid to pH 2.
  (2) After the initial mixing, the mixture was effectively homogenized with a high speed blender (Büchi homogenizer). After the homogenization, the concentration remained approximately the same, i.e. close to initial concentration.
  (3) The sample obtained by this treatment is named as Sample B2

In industrial scale, the mixing step can be carried out with the same device that is used in the last fibrillation stage or it can be carried out with a separate mixing device in subsequent step. The acid can be a weak acid like formic acid or acetic acid, etc. or a strong acid like hydrochloric acid, sulphuric acid, etc. The pH is adjusted below the pKa value of anionic groups on the fibril cellulose, which typically means pH between 2-3.

Example 3

Pressure Filtration

The samples A1, A2, B1, and B2 were concentrated with a pressure filtration apparatus in the following manner.
Filter cloth (Tamfelt): S2181-V2L1K3 (0.4 $m^3/(m^2$ min) (200 Pa)
  (1) After the acid treatment was performed, the gels were place in acid form into a pressure filtration apparatus.
  (2) Water was removed through a coarse wire applying excess pressure on the gel.
  (3) After certain period of time, the concentrated gel, i.e. pressed filter cake was removed.

Figure 3:
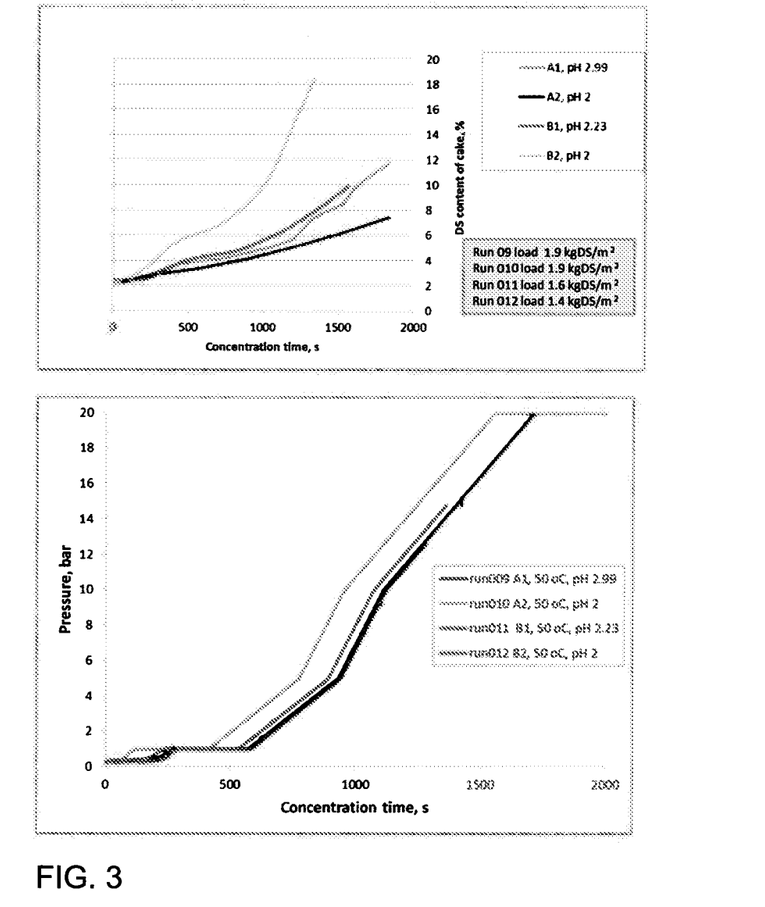
FIG. 3 shows the increase of the solid content of the filter cake as function of time during pressure filtration (top) and pressure increase during pressure filtration as function of time (bottom)

The water removal rate increased remarkably from the gels at low pH, as can be seen from FIG. 3. At neutral pH, most of the water remained in the gel structure, but at acidic conditions dry matter content was easily increased up to 10 or 20%. Respectively, filtration capacity was high, i.e. typically 3-5 $kg/m^2$/hour.

If the result is compared to the situation of the original fibril cellulose hydrogel, the difference is remarkable: water from neutral aqueous hydrogel cannot be removed with pressure filtration in any reasonable manner.

After the pressure filtration, the dry matter content of the samples increased as indicated in Table 1.

TABLE 1

Concentration of the samples before and after the pressure filtration

| Sample | Used acid | Initial concentration | Concentration after pressure filtration |
|---|---|---|---|
| A1 | Acetic acid | 2.3% | 14.3% |
| A2 | Acetic acid | 2.3% | 11.1% |
| B1 | Hydrochloric acid | 2.3% | 9.8% |
| B2 | Hydrochloric acid | 2.3% | 19.7% |

The pressure filtrated samples can be further concentrated or fully dried by subsequent air drying. This was demonstrated with sample B2 by evaporating the residual water at elevated temperature in oven, 50° C. for 10 hours. This completely dry sample is marked as sample B2-dry.

Example 4

Vacuum Filtration

Lowering the pH below the pKa value enhances the water removal also in vacuum filtration. This was demonstrated with fibril cellulose grade sample 1 in following manner:
(1) Aqueous fibril cellulose dispersion was first diluted to 0.1% dispersion at pH 7
(2) The pH was lowered with hydrochloric acid to pH 2. Due to pH drop, the fibril cellulose dispersion started to flocculate
(3) The mixture was placed on vacuum filtration membrane and water retention value was measured to be approximately 30 seconds. The added fibril cellulose amount corresponds to 20 g/m$^2$.

Without lowering the pH, i.e. conducting the same experiment at pH 7, the water retention value varies between 90 to 120 minutes that is nearly 200 times longer compared to same experiment at pH 2.

Example 5

Redispersability

Redispersability of the concentrated samples A1, A2, B1, and B2 was demonstrated in following manner.
(1) Press cakes were first comminuted with Waring blender to 1-3 mm granulates.
(2) Comminuted material redispersed with Waring blender to 0.5% dry matter content. Typically the dispersions were mixed by the blender with 3 or 4 subsequent 10 s intervals.
(3) Viscosity was measured as such (acidic pH) and after neutralisation with 18% NaOH. In some cases, the pH was increased to basic region, i.e. close to pH 10.

Figure 4:
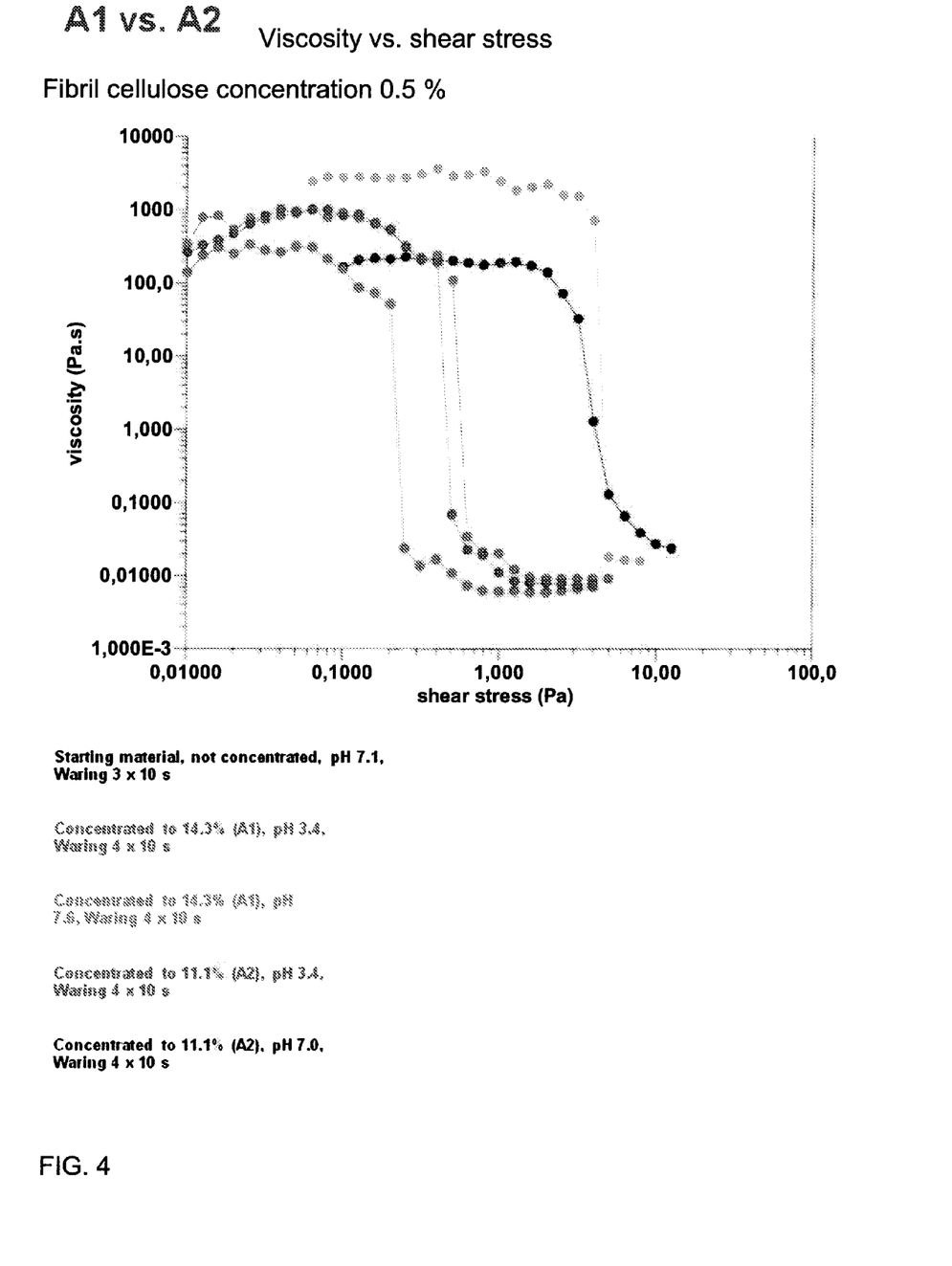
FIG. 4 shows viscosity of 0.5% fibril cellulose dispersions, after the concentration cycle as function of applied shear stress in comparison with a non-concentrated 0.5% sample, from left to right (vertical portion of the graph at 10 Pa·s): A2, concentrated to 11.1%, pH 3.4; A2, 11.1%, pH 7.0; A1, 14.3%, pH 3.5; non-concentrated starting material, pH 7.1; A1, 14.3%, pH 7.6.
Figure 5:
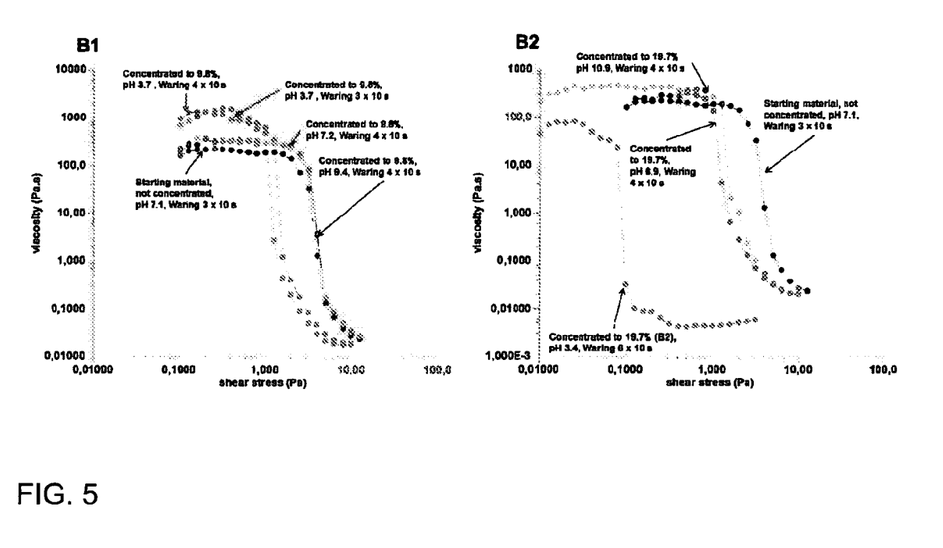
FIG. 5 shows viscosity of 0.5% fibril cellulose dispersions, after the concentration cycle, as function of applied shear stress in comparison with a non-concentrated 0.5% sample, left side: B1 sample, and right side: B2 sample.

Viscosity fibril cellulose dispersions was measured over a broad shear stress (rate) range in a rotational rheometer (AR-G2, TA Instruments, UK) using a vane geometry. The obtained flow curves for the concentrated samples were compared to a sample which was not concentrated, see FIGS. 4 and 5. It was clear that samples B1 and B2 were well redispersed after the concentration process. Flow profile of sample B1 (concentrated to 9.8%) was identical to reference sample. Also sample B2 recovered majority of its rheological properties after the concentration cycle to 19.7%.

Importantly, the both samples B1 and B2, showed the characteristic rheological behaviour also at low pH without neutralization, i.e. at pH 3-4.

One or more additional substances can be incorporated in the redispersable product by adding it/them in the fibril cellulose hydrogel or in the volume of acidic medium (acid bath) where the fibril cellulose hydrogel is later introduced or with which it is homogeneously mixed, or in both the fibril cellulose hydrogel and the volume of acidic medium.

More specifically, for example, anionically stabilized latexes or polymer particles in a dispersion form can be coagulated at the same process step while lowering the pH of the mixture. This enables fast and economically viable process to mix fibril cellulose homogeneously to different matrix polymers and simultaneously remove water from the formed master batch. When aiming to fibril cellulose-polymer masterbatches, the redispersability is not required but the easiness of the water removal is important. Potentially interesting polymer particles are for example various latex particles, such as styrene-butadiene latexes, natural rubber latexes, etc.

The invention is not, however, limited to the use of the dewatered fibril cellulose as redispersable product, but the fibril cellulose made according to the embodiments above can be used as structural parts in various structures, such as in composites, or as such in sheets or membranes which can already shaped when the aqueous fibril cellulose gel is contacted with the acidic medium. It is also possible to shape the fibril cellulose gel while it is in acid form (as a result of its contact with acid), preferably in connection with its dewatering by pressing, so that it will obtain at the same time a desired shape. Additional substances can be incorporated in any of the above-mentioned ways in the fibril cellulose that is to be shaped.

The final product can remain in certain dry substance content when the dewatering is not complete, such as between 10-30%, the rest being mainly water. This product can be in acid form that originates in the acidification of the fibril cellulose gel prior to the dewatering, or it can be in neutral form which is the result of the neutralization after the dewatering. Products in this DS range are easy to handle and readily redispersible in a liquid medium. However, it is possible to make the product that has been dewatered first mechanically to DS of 10-30%, completely dry by air drying, for example at elevated temperature.

The redispersable product has preferably the following properties, when redispersed in water: zero shear viscosity of 1000 to 50000 Pa·s and yield stress of 1-30 Pa, preferably 3-15 Pa as measured at 0.5% concentration in water by rotation rheometer (AR-G2, TA Instruments, UK) using vane geometry.

When pressure filtration is used for the initial concentration of the fibril cellulose, either to final DS or as a preliminary drying step, it can be performed at elevated temperature, preferably between 30 and 70° C.

The apparatus for processing fibril cellulose comprises
means for storing an acidic medium
means for storing an aqueous fibril cellulose gel
means for bringing aqueous fibril cellulose in contact with acidic medium, and
means for dewatering the aqueous fibril cellulose gel after bringing the aqueous fibril cellulose gel in contact with acidic medium.

The means for dewatering the aqueous fibril cellulose gel is preferably a pressure filtration apparatus as described above.

The apparatus contains also means for conveying the aqueous fibril cellulose gel from the means for contacting the fibril cellulose with the acid (like from a mixing tank) to the pressure filtration apparatus. The conveying means is a pump suitable for pumping highly viscous products, like a screw-type pump.

In one particular application, the site of use to which the product is transported semidry or dry is an oilfield. When redispersed at the oilfield, the high viscosity at low share rates, good pumpability at high shear rates, immiscibility with oil and good suspension capacity of solids makes the redispersed fibril cellulose ideal for preparing different working fluids for oil recovery or assisting operations. These fluids include:
hydraulic fracturing fluids,
carrier fluids for gravel packing,
spacer fluid, displacement fluids, "flooding fluids" in enhanced oil recovery,
drilling fluids, and
well completion and workover fluid (as described in U.S. Pat. No. 3,882,029 for example).

The pore blocking capability of the fibril cellulose is also useful property when a fluid containing the NFC as viscosifier is used in subterranean formations.

The invention claimed is:

1. A method for processing anionically charged fibril cellulose which is nanofibrillar cellulose derivative containing additional functional groups making the cellulose anionically charged, manufactured from wood fiber and wherein the fibrils have a maximum diameter of 50 nm and which derivative is in the form of aqueous viscoelastic fibril cellulose hydrogel, the method comprising
lowering the pH of the aqueous fibril cellulose hydrogel below the pKa value of the anionically charged fibril cellulose to pH 2-3 to provide aqueous fibril cellulose hydrogel of reduced water retention capacity, and
dewatering the aqueous fibril cellulose hydrogel of reduced water retention capacity in a pressure filtration step where positive pressure is applied to the aqueous fibril cellulose hydrogel to provide dewatered fibril cellulose.

2. The method according to claim 1, wherein the anionically charged fibril cellulose is chemically modified cellulose containing dissociated acid moieties, which are carboxyl groups, and wherein pH is lowered such that the dissociated acid moieties are converted to acid form.

3. The method according to claim 1, wherein the method comprises
contacting the aqueous fibril cellulose hydrogel with an acidic medium so that the aqueous fibril cellulose hydrogel and the acidic medium are mixed homogeneously.

4. The method according to claim 3, wherein the acidic medium is an aqueous acidic medium.

5. The method according to claim 1, wherein the method comprises
contacting the aqueous fibril cellulose hydro gel with a volume of acidic medium in a controlled manner so that the aqueous fibril cellulose hydrogel is kept as a separate phase and forms one or more discrete physical entities containing the fibril cellulose within the phase,
separating the one or more physical entities from the volume of acidic medium, and
dewatering the one or more physical entities to provide the dewatered fibril cellulose.

6. The method according to claim 5, wherein the aqueous fibril cellulose hydrogel is mechanically disintegrated into discrete physical entities before or after contacting it with a volume of acidic medium.

7. The method according to claim 5, wherein the aqueous fibril cellulose hydrogel is contacted with the volume of acidic medium by introducing aqueous fibril cellulose hydrogel through a port which comprises one or more orifices or nozzles through which the hydrogel issues.

8. The method according to claim 1, wherein the dewatering is performed at a temperature of 30° C. or higher.

9. The method according to claim 8, wherein the dewatering is performed at a temperature of 30-70° C.

10. The method according to claim 1, wherein the aqueous fibril cellulose hydrogel of reduced water retention capacity is dewatered in a pressure filtration step to dry substance content of 10-30 wt-% of fibril cellulose.

11. The method according to claim 1, wherein dewatering the aqueous fibril cellulose hydrogel of reduced water retention capacity comprises removing water by evaporation from the aqueous fibril cellulose hydrogel after the pressure filtration step.

12. The method according to claim 1, wherein the dewatered fibril cellulose is neutralized with a base.

13. The method according to claim 1, wherein the dewatered fibril cellulose is left in acid form.

14. The method according to claim 1, wherein the concentration of the aqueous fibril cellulose hydrogel is 0.5-5 wt-%.

15. The method according to claim 1, wherein the method comprises
dispersing the dewatered fibril cellulose in a liquid medium.

16. The method according to claim 15, wherein the method comprises
transporting the dewatered fibril cellulose to a site of use and dispersing the dewatered fibril cellulose in a liquid medium at the site of use.

17. The method according to claim 1, wherein the method comprises
adding acid-coagulable additive coagulable by the effect of lowering pH to the aqueous fibril cellulose hydrogel before lowering the pH of the aqueous fibril cellulose hydrogel, and
coagulating the additive in the hydrogel by lowering the pH.

18. The method according to claim 1, wherein the fibrils have a diameter of 2-20 nm.

19. A fibril cellulose product having a dry substance content of 10-30 wt-% of fibril cellulose, wherein the cellulose is chemically modified nanofibrillar cellulose containing acid moieties in acid form, manufactured from wood fiber and wherein the fibrils have a maximum diameter of 50 nm.

20. The fibril cellulose product according to claim 19, which is redispersable in water as a gel.

21. The fibril cellulose product according to claim 20, which is redispersable in water such that at the concentration of 0.5% it shows a maximum viscosity of at least 100 Pa·s in the shear stress range between 0.01 Pa and the yield stress value as measured at 0.5% concentration in water.

22. The fibril cellulose product according to claim 20, where the fibril cellulose has a zero shear viscosity of 1000 to 50000 Pa·s and a yield stress of 1-30 Pa, as measured at 0.5% concentration in water.

23. The fibril cellulose product according to claim 22, where the fibril cellulose has a yield stress of 3-15 Pa, as measured at 0.5% concentration in water.

24. The fibril cellulose product according to claim 19, wherein the product contains acid-coagulated substance coagulated by the effect of lowering pH within the fibril cellulose.

25. The fibril cellulose product according to claim 24, wherein the product is a fibril cellulose-polymer masterbatch.

26. The fibril cellulose product of claim 19 obtained by a method for processing anionically charged fibril cellulose which is nanofibrillar cellulose derivative containing additional functional groups making the cellulose anionically charged, and is in the form of aqueous fibril cellulose hydrogel, the method comprising
lowering the pH of the aqueous fibril cellulose hydrogel below the pKa value of the anionically charged fibril cellulose to pH 2-3 to provide aqueous fibril cellulose hydrogel of reduced water retention capacity, and
dewatering the aqueous fibril cellulose hydrogel of reduced water retention capacity in a pressure filtration step where positive pressure is applied to the aqueous fibril cellulose hydrogel to provide dewatered fibril cellulose.

27. A fibril cellulose product where the fibril cellulose is anionically charged nanofibrillar cellulose having a dry substance content of 10-30 wt-% of fibril cellulose wherein the cellulose is in neutralized form in the product, manufactured from wood fiber and wherein the fibrils have a maximum diameter of 50 nm.

28. The fibril cellulose product according to claim 27, which is redispersable in water as a gel.

29. The fibril cellulose product according to claim 28, which is redispersable in water such that at the concentration of 0.5% it shows a maximum viscosity of at least 100 Pa·s in the shear stress range between 0.01 Pa and the yield stress value as measured at 0.5% concentration in water.

30. The fibril cellulose product according to claim 28, where the fibril cellulose has a zero shear viscosity of 1000 to 50000 Pa·s and a yield stress of 1-30 Pa, as measured at 0.5% concentration in water.

31. The fibril cellulose product according to claim 30, where the fibril cellulose has a yield stress of 3-15 Pa, as measured at 0.5% concentration in water.

32. The fibril cellulose product according to claim 27, wherein the product contains acid-coagulated substance coagulated by the effect of lowering pH within the fibril cellulose.

33. The fibril cellulose product according to claim 32, wherein the product is a fibril cellulose-polymer masterbatch.

34. The fibril cellulose product of claim 27 obtained by a method for processing anionically charged fibril cellulose which is nanofibrillar cellulose derivative containing additional functional groups making the cellulose anionically charged, and is in the form of aqueous fibril cellulose hydrogel, the method comprising lowering the pH of the aqueous fibril cellulose hydrogel below the pKa value of the anionically charged fibril cellulose to pH 2-3 to provide aqueous fibril cellulose hydrogel of reduced water retention capacity, and dewatering the aqueous fibril cellulose hydrogel of reduced water retention capacity in a pressure filtration step where positive pressure is applied to the aqueous fibril cellulose hydrogel to provide dewatered fibril cellulose.

* * * * *